US007805384B1

(12) United States Patent
Pagel

(10) Patent No.: US 7,805,384 B1
(45) Date of Patent: Sep. 28, 2010

(54) POSTAL PRINTER DRIVER SYSTEM AND METHOD

(75) Inventor: Martin Pagel, Kirkland, WA (US)

(73) Assignee: Stamps.com, Inc., Los Angeles, CA (US)

( * ) Notice: Subject to any disclaimer, the term of this patent is extended or adjusted under 35 U.S.C. 154(b) by 556 days.

(21) Appl. No.: 09/469,561

(22) Filed: Dec. 22, 1999

(51) Int. Cl.
*G06F 17/00* (2006.01)

(52) U.S. Cl. ....... 705/401

(58) Field of Classification Search ....... 358/1.13; 705/410, 405, 401, 404, 406, 408; 364/464.16, 364/464.2
See application file for complete search history.

(56) References Cited

U.S. PATENT DOCUMENTS

| | | | | |
|---|---|---|---|---|
| 4,661,001 | A | 4/1987 | Takai et al. | |
| 4,757,537 | A | 7/1988 | Edelmann et al. | |
| 4,775,246 | A | 10/1988 | Edelmann et al. | |
| 4,831,555 | A | 5/1989 | Sansone et al. | |
| 4,862,386 | A | 8/1989 | Axelrod et al. | |
| 4,900,903 | A | 2/1990 | Wright et al. | |
| 4,900,904 | A | 2/1990 | Wright et al. | |
| 4,908,770 | A | 3/1990 | Breault et al. | |
| 4,949,098 | A * | 8/1990 | Gluck et al. | 347/197 |
| 5,111,030 | A | 5/1992 | Brasington et al. | |
| 5,319,562 | A | 6/1994 | Whitehouse | |
| 5,341,505 | A | 8/1994 | Whitehouse | |
| 5,384,886 | A * | 1/1995 | Rourke | 715/202 |
| 5,401,943 | A * | 3/1995 | Dietrich et al. | 235/375 |
| 5,454,038 | A | 9/1995 | Cordery et al. | |
| 5,573,277 | A | 11/1996 | Petkovsek | |
| 5,628,249 | A * | 5/1997 | Cordery et al. | 101/91 |
| 5,664,725 | A * | 9/1997 | Walz et al. | 229/92 |
| 5,684,706 | A * | 11/1997 | Harman et al. | 700/95 |
| 5,774,886 | A | 6/1998 | Kara | |
| 5,778,076 | A | 7/1998 | Kara et al. | |
| 5,796,834 | A | 8/1998 | Whitney et al. | |
| 5,801,364 | A | 9/1998 | Kara et al. | |
| 5,801,944 | A | 9/1998 | Kara | |
| 5,812,991 | A | 9/1998 | Kara | |
| 5,819,240 | A | 10/1998 | Kara | |

(Continued)

FOREIGN PATENT DOCUMENTS

EP 536640 A2 * 4/1993

(Continued)

OTHER PUBLICATIONS

State Auto Polishes Policy Production; Insurance & Technology; New York; Nov. 1992; Daniele, Elizabeth.*

(Continued)

*Primary Examiner*—John W Hayes
*Assistant Examiner*—Rob Wu
(74) *Attorney, Agent, or Firm*—Fulbright & Jaworski L.L.P.

(57) ABSTRACT

There is disclosed a printer control system and method for abstracting the data flow to a printer, or other device, and for using the abstracted information for controlling additional processes with respect to the printer. In one embodiment, the abstracted information is used to print envelope information, such as addressee and/or a postage indicia. The postage indicia can be either generated from the abstracted data or the indicia itself can be abstracted from the data stream. In another embodiment, the process to be controlled is as downline process, such as a folding operation or the printing of information related to the original printed document.

44 Claims, 4 Drawing Sheets

U.S. PATENT DOCUMENTS

| | | | | |
|---|---|---|---|---|
| 5,822,739 | A | 10/1998 | Kara | |
| 5,825,893 | A | 10/1998 | Kara | |
| 5,826,034 | A | 10/1998 | Albal | 395/200.69 |
| 5,869,824 | A * | 2/1999 | Okada et al. | 235/380 |
| 5,873,073 | A * | 2/1999 | Bresnan et al. | 705/410 |
| 5,929,415 | A | 7/1999 | Berson | |
| 6,010,156 | A | 1/2000 | Block | |
| 6,026,385 | A | 2/2000 | Harvey et al. | |
| 6,282,524 | B1 * | 8/2001 | Kramer | 705/408 |
| 6,337,743 | B1 * | 1/2002 | Brown et al. | 358/1.13 |
| 6,384,931 | B1 * | 5/2002 | Brown et al. | 358/1.18 |
| 6,741,971 | B1 * | 5/2004 | Duval et al. | 705/401 |

FOREIGN PATENT DOCUMENTS

| | | | |
|---|---|---|---|
| EP | 0 923 024 | | 6/1999 |
| EP | 0927581 | A2 * | 7/1999 |
| EP | 0974914 | A2 * | 1/2000 |
| WO | WO98/14909 | | 4/1998 |
| WO | WO 99/48054 | | 9/1999 |

OTHER PUBLICATIONS

Author Unknown, "Oracle: JetForm announces new JetForm Output Pak for Oracle Applications", May 6, 1999, M2 Presswire 3 pages.*

* cited by examiner

POSTAL PRINTER DRIVER SYSTEM AND METHOD

RELATED APPLICATIONS

Reference is made to the following and commonly assigned U.S. Pat. No. 5,983,209 issued Nov. 9, 1999, entitled SYSTEM AND METHOD FOR DETERMINATION OF POSTAL ITEM WEIGHT BY CONTEXT, and to U.S. patent application Ser. No. 08/953,477 entitled "POSTAGE SERVER SYSTEM AND METHOD," filed Oct. 17, 1997, the disclosures of which are all incorporated herein by reference.

TECHNICAL FIELD

This invention relates to printer drivers and more particularly to systems and methods for abstracting certain information from a data stream deliverable to a printer from a computing device, and even more specifically to a system and method for generating and printing address information and postage onto an envelope associated with material printed at the printer.

BACKGROUND

It is now becoming common to use a PC or other general purpose computing device to generate and print postage onto an envelope. The above-identified patent application is an example of the generation of postage from word processing or other application programs running on a PC.

In such systems, a general purpose printer is used to print the postage. The printer operates from a data stream provided by the PC which in turn is working in cooperation with a postage storage and control device. A user creates a document, for example, a letter, using a word processing application program. Contained within the letter is address information which the word processor abstracts and then communicates to a postage generation program (either part of the word processing program or separate therefrom). The postage generation program then accesses a secure memory and creates a postage indicia, part of which contains a digital signal (or other authentication mechanism), and then this indicia data stream is communicated to the general purpose printer. The printer then prints the indicia on an envelope together with the address information for the envelope. In one embodiment of the existing system the secure memory and its control processors are located in the communication path between the PC and the printer.

In operation, the user must first send a data stream to control the printing of the letter and then the user, or the system operating for the user, must send data to the printer to print the address and postage on the envelope or on the label. This typically requires two distinct functions, each controlled by the PC. In addition, at times there is a need to create a window envelope insert, containing the address and/or postage indicia. Again, this requires two separate operations unless the separate insert is made a part of the letter "file" in the PC.

Thus, it is desired to further automate the printing/handling process of material printed by general purpose printers to eliminate as many steps as possible a user must take to print and subsequently process the printed material.

It is further desired to automate the mailing process by automating as many steps in the process as possible.

SUMMARY OF THE INVENTION

These and other objects, features and technical advantages are achieved by a system and method operable in conjunction with a general purpose printer such that the data stream that is sent to the printer from the processor is monitored and certain data is abstracted therefrom such that the abstracted data will operate to control subsequent processing of the printed material. Thus, the data stream that is sent to a printer to enable the printing of a letter, or series of letters, is monitored and certain data, such as, by way of example, address information, is abstracted therefrom. The abstracted address data would then be used to create the address information for the subsequent (or concurrent) printing of an envelope. The abstracted information can also then be used to control the printing (or even the generation) of the postage indicia.

In one embodiment of the invention, the abstracted information is used to create a separate insert containing the address and/or postage indicia. The separate insert is then used within a "see through" type envelope of the type shown in U.S. Design Pat. No. 384,098 dated Sep. 23, 1997, entitled "Stampless Envelope", hereby incorporated by reference herein.

The abstracted information can be used, for example, to print certain information, such as the postage indicia and/or address data concurrently on another printer, or by using a second printing mechanism of the same printer. The abstracted information can also be used to control subsequent processing of the printed paper, such as, by way of example, folding and/or stuffing the printed material in an envelope or to send the data to multiple locations. Because the number of pages actually printed, as well as the weight of the paper is known by the printer, the amount of postage can be easily calculated, all controlled in conjunction with the abstracted information. In addition, the "abstract" could be the entire document (or a portion of the document) which could be sent to some destination other than the printer, such as, for example, a fax to a recipient, an e-mail or even to a storage or other server. The destination could be a web site, a remote print facility or a conversion to another medium, such as a TV signal.

In one embodiment the information is abstracted within the actual printer, while in other embodiments the abstraction occurs between the processor program and the printer device, or even within the processing program itself. Also, the postage storage device, which is typically within the PC or attached to the printer port of the PC, can be located, if desired, within, or in close association with, the printer, or within (or in conjunction with) a printer server.

These and other objects, features and technical advantages are achieved by a system and method in which the print stream is intercepted, either within the printer or external thereto, such that the print output of any software application running on any computer is enhanced to improve the printing process. In particular, bar coding information and/or postage can be added and either an envelope or a label can be printed. In addition, the printed material can be modified by adding certain information (by printing a cover sheet) such that the material can be placed in a window envelope, thereby avoiding the printing of an envelope. Optionally the driver can also control an inserter such that the mailing is automatically inserted into the printed envelope or into a window envelope.

Also, labels can be printed and applied to a package, envelope, or sleeve possibly before or after the insertion of the printed mail item.

One important factor is that the output generating software application running in the PC need not be modified. To the application the new system and method could appear to be an optional printing destination, or it might be completely transparent to the PC application program. However, the printer driver could bring up a dialog box to ask the user for options, like envelope or label type and size, location of the area where the address and stamp information is to be printed. In addition, the user could specify where the address is being printed on the letter by the application such that the address can be more easily recognized and thereby more easily abstracted. The system might also request confirmation that real postage needs to be applied versus performing a draft or test printout with dummy postage.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
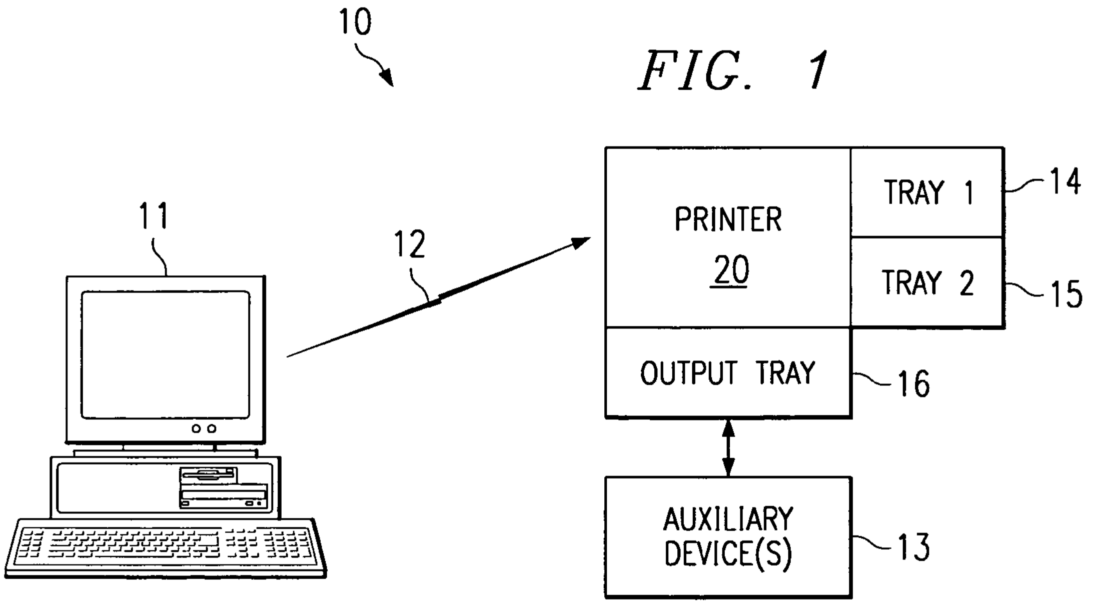
FIG. 1 shows a printer driven by a PC.

Turning now to FIG. 1, there is shown in one embodiment system 10 which includes, for example, PC 11, communicating via link 12 to printer 20, and associated with printer 20 is one or more auxiliary devices 13 which are optional as will be discussed in more detail hereinafter. Printer 20 may have several paper trays 14 and 15 and may have output tray 16. Printer 20 can be any one of the well known printers available in the industry as well as PC 11 which could be any personal computer or other processor, or in fact, could be any device that creates a stream of data for subsequent printing or display at printer 20. Also note that printer 20 could be a display for a computer or television to which data is sent.

As will be seen in one embodiment, postage is created at PC 11, which postage is associated with a particular letter or with a particular envelope. This postage indicia is sent from a computing device to a printer as discussed in the above-identified patent application entitled SYSTEM AND METHOD FOR DETERMINATION OF POSTAL ITEM WEIGHT BY CONTEXT. As will be discussed, the indicia is sent via link 12 to the printer, together with other information. Printer 20 then abstracts data from the data stream, including, if desired, the indicia information, and also abstracts from the material to be printed certain other information. For example, the address information of the sender and the recipient can be abstracted, and then subsequently or concurrently printed using either a separate print head, an auxiliary print head on a different machine, or the same print head on the main machine at a time prior or subsequent to when the letter is actually printed. It should also be noted that auxiliary device 13 could be a folding machine or a stuffer or a combination so that the abstracted information will provide information for subsequent printing operations after the main printing operation. In addition, the abstracted information could generate a cover sheet, a fax sheet, or any other information which could be sent concurrently or separately from the printed information. For example, the abstracted information could be used to send an e-mail to a recipient indicating when the letter is being posted and the tracking Id of the letter, if desired, or could send an e-mail or other information back to a sender for logging the information into a file or into a data base for subsequent retrieval. In some situations, the entire document (or most of it) will become the abstracted information. This primarily will be when it is desired to send the document (or key portions of it) to one or more other locations, such as a web site, or as a fax, or e-mail or to place the document in a memory or on a server. The abstracted information could, for example, be graphics (or some other special data), which graphics would then be routed to a different printer or to a different presentation medium. Also the system could detect different applications (Word, WordPerfect, Excel) and send each to a different location. The system could be designed to key on certain fields, or on certain codes, and depending on such fields (or codes) redirect either one entire document or portion of the document to the ancillary facility. Auxiliary devices 13 could be any number of devices, either locally or remote, and could be print devices, storage devices, media change devices, web sites, fax transmissions, e-mail-type transmissions, and/or conversion applications. Data transfer can occur in any one of a number of ways. One such way could be, for example, U.S. Pat. No. 5,826,034, which is hereby incorporated by reference herein. Another example is the aforementioned patent application entitled Postage Server System and Method.

Figure 2:
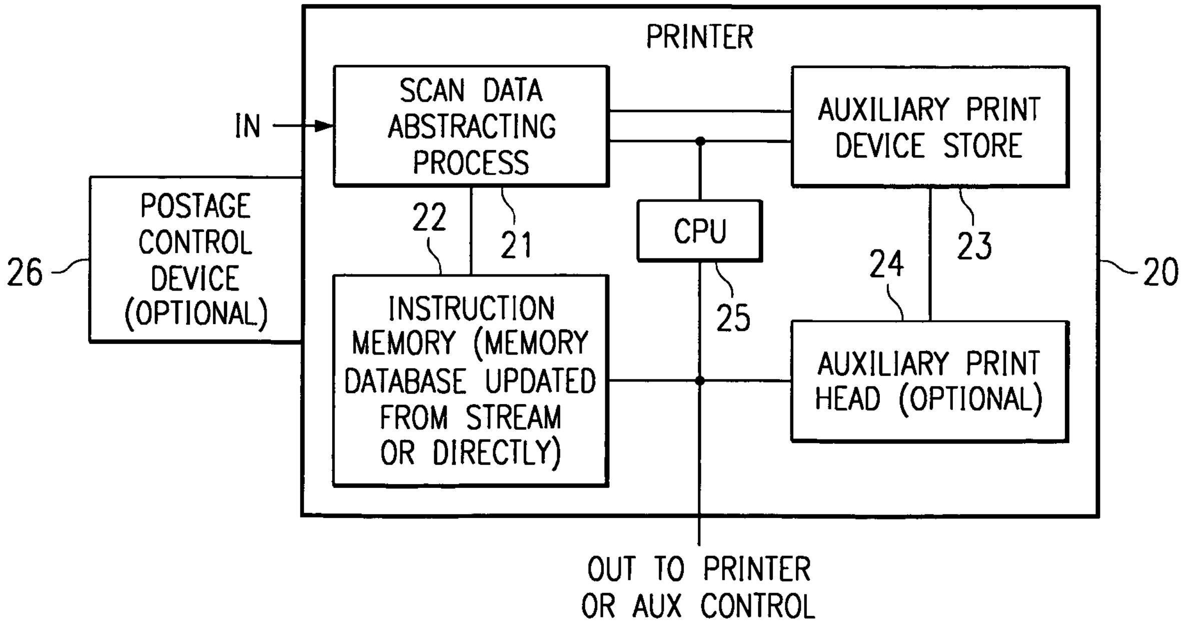
FIG. 2 shows details of a printer.

FIG. 2 shows details of a typical printer 20 where the information would ask through scanned data abstract device 21 which would operate to remove certain data from the data stream. The data that is removed could, for example, be stored in an instruction memory 22, which memory could be programmed at one time or could be programmed to change from time to time based upon information sent over the input directly to instruction memory 22, or received in the other manner. These instructions could be used to determine what types of data are being abstracted and could be used to change the output auxiliary devices 13 as desired. CPU 25 could be used, if desired, to control the processing (such as scanning of the data flow and/or comparisons and verifications) and to control the generation of a postage indicia via postage control device 26 in situations where the postage indicia is not sent from the computing device such as PC 11 to the printer in the initial data transmission. Scanned data device 21 then can store the abstracted information in auxiliary print store 23 for delivery to an ancillary facility, such as for subsequent printing using an auxiliary print head 24 or using the main print head of the printer (not shown) or sent to an auxiliary device 13 shown in FIG. 1. Note that auxiliary print head 24 is optional and can be, for example, a printer that only prints envelopes (or labels) or only prints certain types of documents using separate types of paper, different color paper, or using different paper trays.

Figure 3:
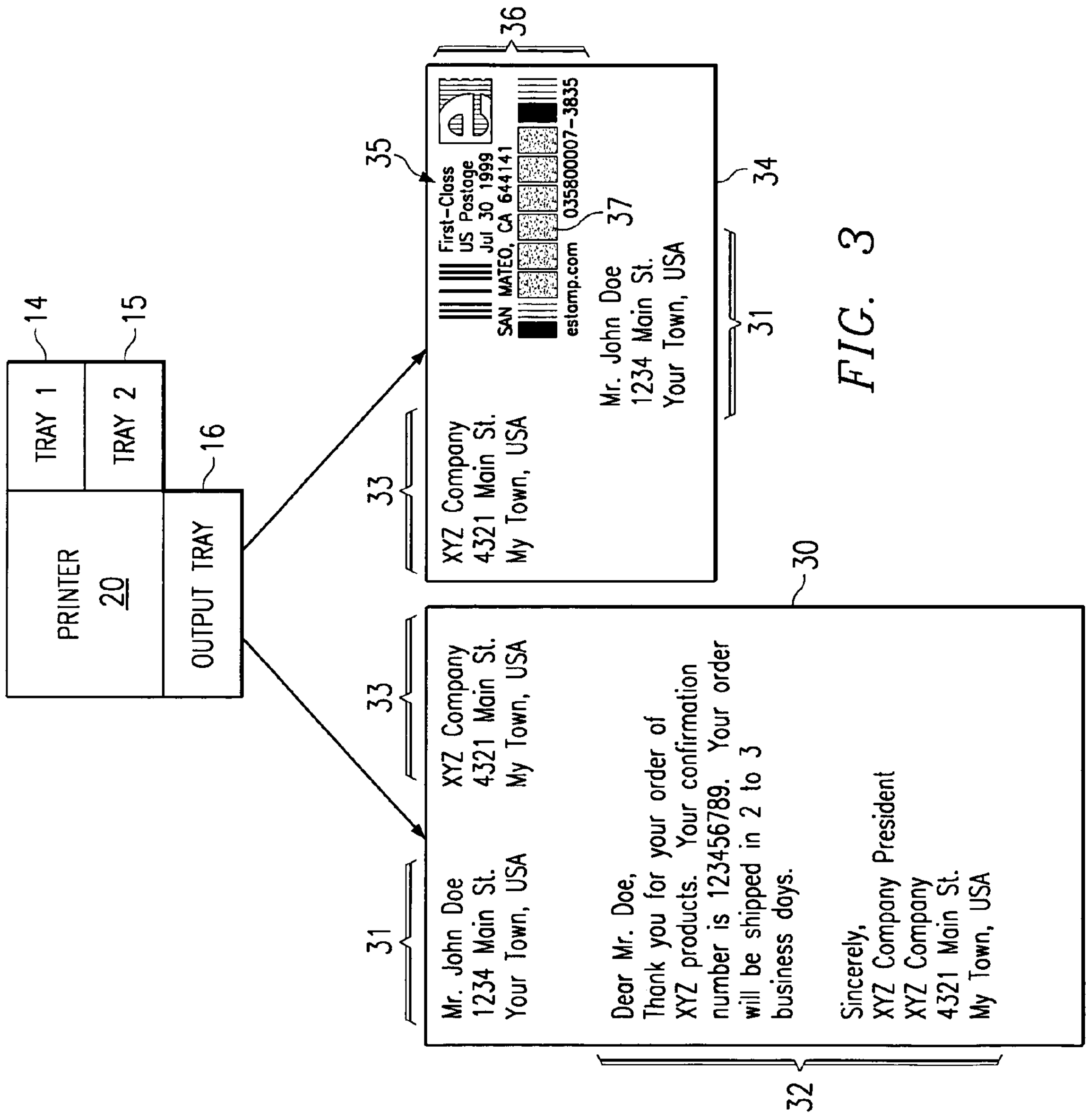
FIG. 3 shows the printer and output of a letter and envelope with information having been abstracted from the data stream.

FIG. 3 shows printer 20 having its output tray 16 feeding out letter 30 and corresponding envelope 35 with postage indicia 36, including, if desired, bar codes and other security information 37. They could come out simultaneously using different print heads or could come out serially and then be correlated together. Different physical printers could be used to print different portions of a document, if desired. Letter 30 has on it the sender's information such as letterhead 33, the receiver's information such as address information 31, and of course the bulk of the letter 32. The envelope 34 would then have on it the abstracted information which would include the return address 33, which was abstracted from the letterhead, the recipient address 31, which was abstracted from the addressee information of the letter, and indicia 36, which would either have been abstracted from the data stream or created, as discussed above with respect to FIG. 2. If created from the abstracted data, the system would operate in conjunction with a PC postage system, such as obtainable from E-Stamp Corporation, using a secure postage metering system (not shown) located in conjunction with the data stream. The system could also log onto a network connection, either a LAN or a public network (such as the internet) and obtain a postal indicia, or other material (or instructions) to be used in conjunction with a printed document.

Figure 4:
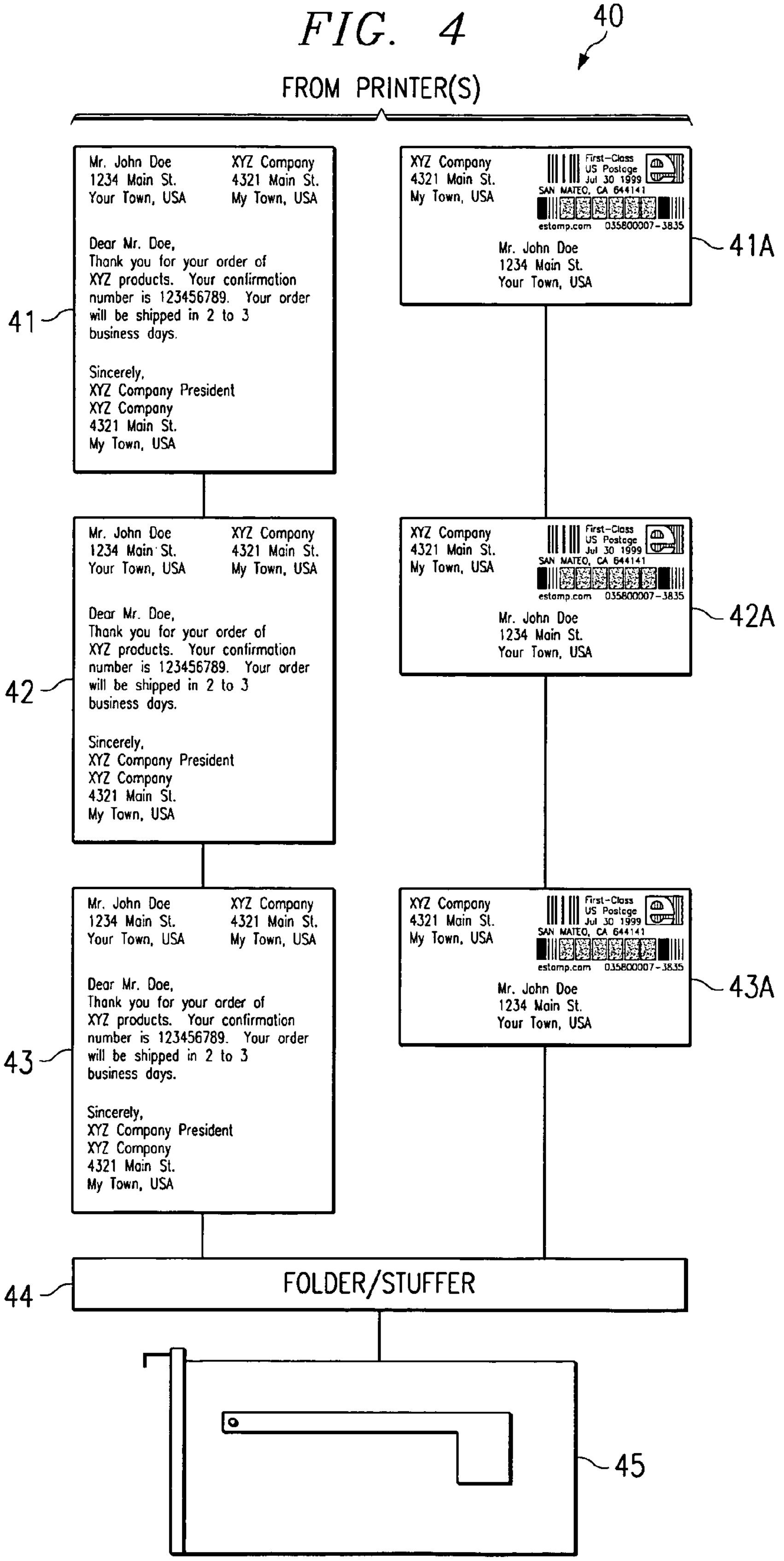
FIG. 4 shows a mass mailing process using the systems and methods of this invention.

FIG. 4 shows a representation of a mass mailing system where several letters 41, 42, 43 are sequentially printed and their corresponding envelopes 41A, 42A, 43A are sequentially coordinated such that folded stuffer 44 then can take the information, the letters, fold them and put them into the proper envelopes and place them in mailbox 45.

Figure 5:
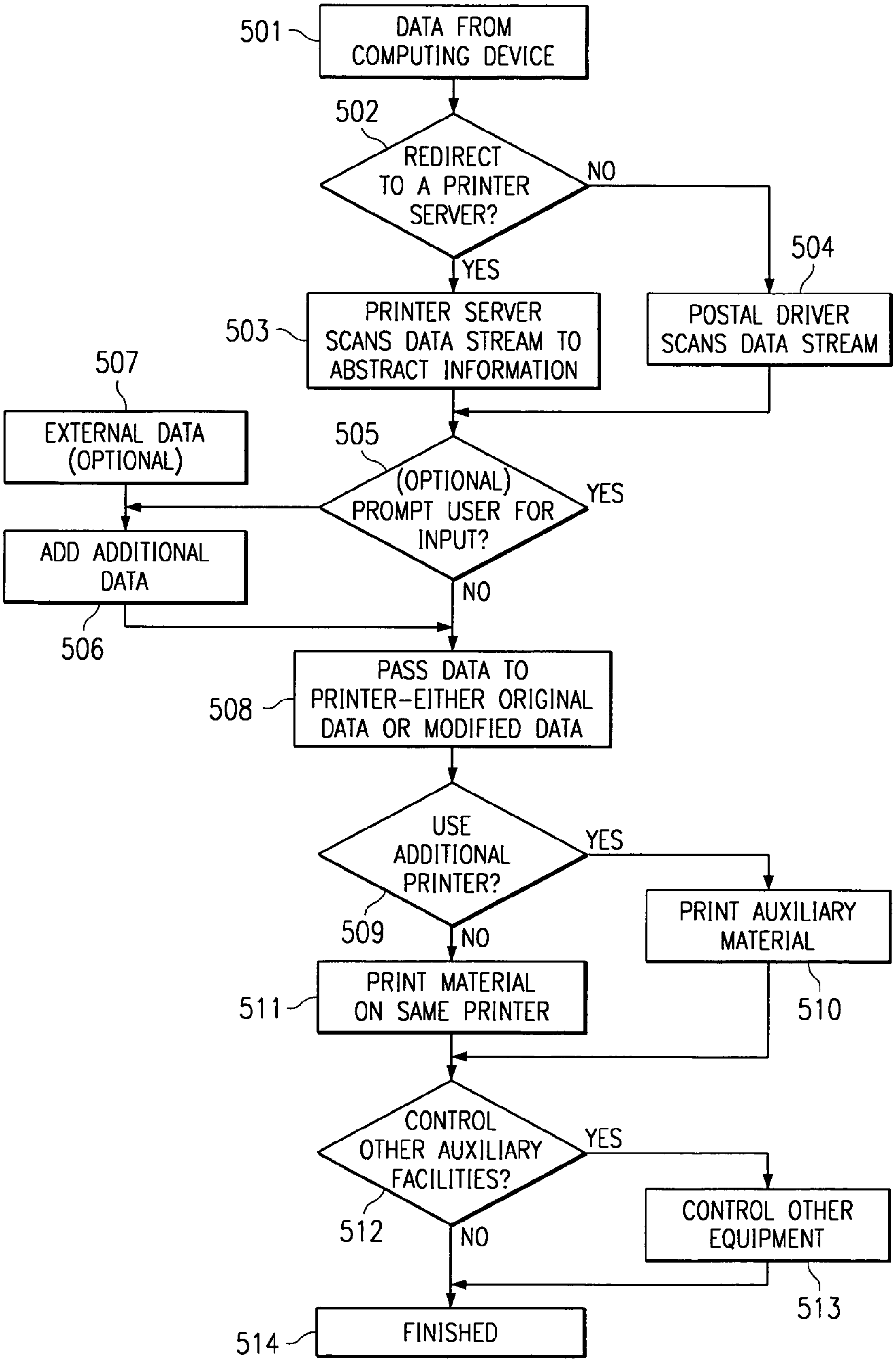
FIG. 5 shows the flow chart of a typical system operation.

FIG. 5 shows a flow chart where box 501 allows a software application to generate output. This output is (optionally) allowed, box 502, to redirect output to a printer server. If the printer server, box 503, is used it will then control the process. If a print server is not available, then the postal printer driver scans the output as shown in box 504. Optionally, box 505, allows the postal printer driver to prompt the user for options, using a dialog box, box 506, or other mechanism, box 507.

The postal printer driver passes the original or modified/enhanced output onto the printer or to the printer's regular printer driver. The printer may be local, remote, or accessible through a print server. The printer's driver generates the printer specific control codes and passes them to the printer. The printer prints the contents to be mailed as shown in box 508. Optionally, the postal printer driver generates additional print output for envelopes or labels and sends this data to the same printer as is used for the main document, boxes 509, 511, or to a dedicated printer, box 509, 510 which prints the mailing data.

The postal printer driver can, optionally, control optional equipment, boxes 512 and 513, like folder and/or inserter and/or label application equipment. This system can be used in conjunction with the Postage Server System and method, as identified above. It should be noted that the printer driver (which can, for example, be elements 21, 22 in FIG. 2) can be executed on the original computer, a network server or spooling device, or within the printer. Also, many of the steps can be reversed or eliminated.

Interception and/or abstraction can occur at different levels: Microsoft Windows provides a printer driver architecture which allows any Windows application software to print to any printer through a printer driver interface such that the application need not be aware of the specifics of any particular printer. This provides for a printer driver layer between the application and the printer which translates output and information requests from an application to the printer specific control commands. The invention could be implemented by adding a postal layer between the application and the application and the printer driver. To the application this layer looks like a printer driver and to the printer driver it looks like an application. Microsoft Windows NT and Windows 2000 provide a print queue processor which is invoked by the spooler to send queued print data through the printer driver to a printer. The print queue processor could be enhanced to provide the functionality described herein.

Some of the functionality could also be provided through a special printer. The printer can accept the print output from an application running on a computer and then interpret it and enhance it as described in this patent. This functionality is in addition to that performed currently in the PFE Mailprinter. This additional functionality would be, for example, the addition of a cover page to support window envelopes or the generation of a postage indicia as displayed above.

First the postal driver must scan the application output and determine the beginning and end of a mail item. This is straightforward if only a single mail item is generated or if a new print job is generated for each mail item. Some applications however might generate multiple mail items in batch (for example a billing application might generate several invoices or a word processor might perform a mail merge) and not separate such mail items specifically in a print job. In these situations the postal driver must scan the print job to separate it into individual mail items. This could be accomplished by scanning each page for a mailing date, a return, and/or a destination address or for a similar (repeat) layout as the first page. In any case, the postal driver might want to identify and process the destination address for inclusion in the postage generation, and include the calculation of the postage amount. It might also process the destination address further, by performing reformatting or address validating against address databases (either stored in the printer or remotely accessible) to then print the address on an envelope or label and to generate further bar codes like the Postnet bar code required by the USPS. The postal driver might also identify the size of each mail item, meaning the number of pages, and use this information to calculate the postage amount.

The system and method could abstract certain information, or based on certain parameters (such as page count, control codes, return address data, etc.), and then bring up a dialog screen to allow the user to answer questions or to enter data to be used in the subsequent operation. The data to be entered can come, for example, from a user, from another application or from another system, either local or remote from the printer or printer driver.

As discussed above, the calculation can be local to the printer (if the abstraction occurs at the printer), or the printer can send information back to the PC. Preparation for mailing can be done by printing a label or a sheet of labels; either one label for each mail item or on a separate address and stamp label; either on the same printer or a separate label printer printing a cover page, similar to a fax cover page, containing the destination address, optional return address, and stamp information, as well as additional bar codes required by postal organizations or for tracking purposes to fit into a window envelope. Also note that the printer can be a single stand alone printer, or a group of printers or a printer server. One of the ancillary functions that can be controlled is the normalization of addresses, or other data, so that it fits within a standard. For example, certain words (such as Texas) can be abbreviated properly, or data formats changed to conform to a standard acceptable "look" and position on a document.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of printing a data stream being presented to a printer, said data stream adapted to enable said printer to print on one or more sheets of paper information in accordance with said data stream, said data stream containing data bits useful for controlling functions additional to said printing information in accordance with said data stream, said method comprising:

abstracting at least a portion of said data bits from said data stream with a postal printer driver, wherein said data stream is provided by an application which has not been adapted to control said additional functions and said abstracting includes examining said data stream for data patterns native to output of said application;

using at least some of said abstracted data bits for controlling at least one of said additional functions, wherein said at least one of said additional functions comprises printing of a postage indicia; and creating, from said abstracted data bits, a separate data stream for controlling the printing of said postage indicia.

2. The method claim 1 wherein said at least one additional function further comprises printing of address information on material separate from said printing information in accordance with said data stream.

3. The method of claim 1 wherein said at least one additional function further comprises the printing of a postage indicia on material separate from said printing information in accordance with said data stream.

4. The method of claim 1 wherein said at least one additional function further comprises a dialog box for allowing options from a user.

5. The method of claim 1 wherein said at least one additional function further comprises directing the abstracted portion to multiple locations.

6. The method of claim 1 wherein said at least one additional function further comprises storage in a memory.

7. The method of claim 1 wherein said at least one additional function further comprises directing the abstracted portion to a viewable medium.

8. The method of claim 1 wherein said at least one additional function further comprises the changing of form of the data.

9. The method of claim 1 wherein said at least one additional function further comprises the delivery of said data to a location remote from said printer driver.

10. The method of claim 1 wherein said at least one additional function further comprises the change in at least one of location and format of the data based upon an interaction between certain data in said data stream and data stored in said printer driver.

11. The method of claim 1 wherein said printer driver is operable on said data stream coming from said application operating in a computing device to control at least a portion of the printing of said printer.

12. The method of claim 11 wherein said printer driver is located remote from said computing device.

13. The method of claim 11 wherein said printer driver is located within said printer.

14. The method of claim 1 wherein said data patterns are selected from the list including:

return address, destination address, mailing date, number of pages, type of inserts, mailing service type, postage indicia, bar codes, tracking codes, control codes, graphics, application types.

15. The method of claim 1 wherein said additional function further comprises the printing of said postage indicia on a document other than the document to which said data stream is being directed.

16. The method of claim 1 wherein said data patterns include the beginning and ending of address information contained within said data stream.

17. The method of claim 1 wherein said data patterns include the beginning and ending of each document to be printed.

18. The method of claim 1 wherein said data patterns include the number of pages of a document.

19. The method of claim 1, wherein said at least one additional function further comprises accepting data from a source other than said data stream.

20. The method of claim 1 further comprising:

controlling the abstraction from said data stream by a code embedded in said data stream.

21. A method of printing a data stream being presented to a printer, said data stream adapted to enable said printer to print on one or more sheets of paper information in accordance with said data stream, said data stream containing data bits useful for controlling functions additional to said printing information in accordance with said data stream, said method comprising:

abstracting at least a portion of said data bits from said data stream;

using at least some of said abstracted data bits for controlling at least one of said additional functions, wherein said at least one of said additional functions comprises printing of a postage indicia; and creating, from said abstracted data bits, a separate data stream for controlling the printing of said postage indicia;

wherein said printer driver is operable on said data stream coming from a program operating in a computing device to control at least a portion of the printing of said printer, wherein said abstracting includes examining said data stream for preestablished data patterns, and wherein said preestablished data patterns include the beginning and ending of postage indicia data.

22. The method of claim 21 further comprising:

controlling the abstraction from said data stream by a code embedded in said data.

23. A method of printing information on a printed document, said method comprising the steps of:

sending a data stream to a printing device;

reviewing said data stream to create therefrom a separate data stream for controlling additional functions with respect to printing of documents, wherein said separate data stream includes data accepted from a source other than said data stream to said printing device;

maintaining in a secure memory an amount available for controlling the generation of a postage indicia;

calculating under joint control of said secure memory and said separate data stream an amount of postage to be applied to a particular document to be printed;

deducting said calculated postage amount from said secure memory if said calculated postage amount is available in said secure memory; and printing information from said data stream in accordance with said additional functions.

24. The method of claim 23 wherein said additional functions are selected from the list including printing address information, printing postage indicia, folding a printed document, stuffing a printed document into an envelope, creating a mailing address for the delivery of a printed document, creating a postage indicia, creating an auxiliary document in association with a printed document, controlling a second printer operating in conjunction with said printer, verifying the address, normalizing the address, adding delivery bar codes.

25. The method of claim 23 wherein said reviewing step includes the step of:

copying from said data stream portions of said data stream.

26. The method of claim 25 wherein said portions include address information with respect to a particular document to be printed.

27. The method of claim 26 further including the step of:

creating from said copied address information a postage indicia.

28. The method of claim 25 wherein said portions include postage indicia information with respect to a particular document to be printed.

29. The method of claim 23 wherein said reviewing step includes the step of enabling a dialog box.

30. The method of claim 29 wherein said dialog box interacts with a user to provide at least one of the following:

return address and logo;

date of mailing;

address verification/prompt for insufficient information;

review scanned data;

hints for scanning data stream;

additional cover page information or label/envelope customization;

delivery (mail service, fax, e-mail, etc.); and options (postage amount, paper weight, weight of inserts, additional mail services).

31. A computer program product, embodied on a computer-readable medium, for use in association with a data stream being directed to a general purpose printer when executed, said data stream adapted to enable said printer to print information in accordance with said data stream, said computer program product comprising:

an abstracting program operable for reviewing said data stream to obtain from said data stream a separate data stream for controlling additional printing operations ancillary to said printing operation, wherein said one ancillary operation further comprises the acceptance of data from a source other than said data stream, wherein said data stream is provided by an application which has not been adapted to control said additional printing operations; and a controller working in cooperation with said abstracting program and with said separate data stream for enabling at least one said ancillary printing operation, wherein said at least one ancillary operation comprises the printing of a postage indicia on material separate from material on which printing of said information is occurring.

32. The computer product of claim 31 wherein said at least one ancillary operation comprises the printing of address information on material separate from material on which printing is occurring.

33. The computer product of claim 31 wherein said computer product is operable on said data stream coming from a general purpose computing device.

34. The computer product of claim 33 wherein said computer product is located remote from said computing device.

35. The computer product of claim 33 wherein said computer product is located within said printer.

36. The computer product of claim 31 wherein said abstracting program includes:

a control program for examining said data stream for certain preestablished data patterns, wherein said control program examines said data stream for data patterns native to output of said application.

37. The computer program product of claim 31 wherein said abstraction program is controlled by a code embedded in said data stream.

38. The computer product of claim 36 wherein one said ancillary operation comprises the printing of said postage indicia on a document other than the document to which said data stream is being directed.

39. The computer product of claim 36 wherein said certain preestablished data patterns include the beginning and ending of address information contained within said data stream.

40. The computer product of claim 39 wherein said computer product further contains:

a program for creating from said address information data for controlling the printing of a postage indicia.

41. The computer product of claim 39 wherein said certain preestablished data patterns include the beginning and ending of each document to be printed.

42. The computer product of claim 36 wherein said data patterns are selected from the list including:

return address, destination address, mailing date, number of pages, type of inserts, mailing service type, postage indicia, bar codes, tracking codes, control codes.

43. A computer program product, embodied on a computer-readable medium, for use in association with a data stream being directed to a general purpose printer when executed, said data stream adapted to enable said printer to print information in accordance with said data stream, said computer program product comprising:

an abstracting program operable for reviewing said data stream to obtain therefrom a separate data stream for controlling additional printing operations ancillary to said printing operation; and a controller working in cooperation with said abstracting program and with said separate data stream for enabling at least one said ancillary printing operation, wherein said at least one ancillary operation comprises the printing of a postage indicia on material separate from material on which printing of said information is occurring;

wherein said abstracting program includes a control program for examining said data stream for certain preestablished data patterns, and wherein said certain preestablished data patterns include the beginning and ending of postage indicia data.

44. The computer program product of claim 43 wherein said abstraction program is controlled by a code embedded in said data stream.

* * * * *